United States Patent
Mackay et al.

(10) Patent No.: US 6,612,684 B2
(45) Date of Patent: Sep. 2, 2003

(54) METHOD FOR DETERMINING A PRINTER'S SIGNATURE TO PROVIDE PROOF THAT THE PRINTER PRINTED A PARTICULAR DOCUMENT

(75) Inventors: Donald G. Mackay, Roxbury, CT (US); Claude Zeller, Monroe, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/017,144

(22) Filed: Dec. 14, 2001

(65) Prior Publication Data
US 2003/0112291 A1 Jun. 19, 2003

(51) Int. Cl.$^7$ ................................................. B41J 2/15
(52) U.S. Cl. ............................... 347/40; 347/14; 347/19
(58) Field of Search ............................... 347/40, 14, 19, 347/37, 12

(56) References Cited

U.S. PATENT DOCUMENTS

| | | | |
|---|---|---|---|
| 5,448,269 A | 9/1995 | Cobbs | 347/14 |
| 5,467,709 A | 11/1995 | Salomon | 101/93 |
| 5,513,563 A | 5/1996 | Berson | 101/91 |
| 6,222,569 B1 * | 4/2001 | Kerr et al. | 347/172 |
| 6,341,840 B1 * | 1/2002 | van Doorn et al. | 347/41 |
| 6,523,934 B1 * | 2/2003 | Beauchamp et al. | 347/37 |

* cited by examiner

*Primary Examiner*—Lamson D Nguyen
(74) *Attorney, Agent, or Firm*—Ronald Reichman; Angelo N. Chaclas

(57) ABSTRACT

The number of dots per inch or resolution may be specified within a image on a document or within a postal indicia and later checked to determine if the image or document or the postal indicia has the correct resolution. The foregoing is accomplished by specifying that the image on the substrate will be printed with n plus m dots per inch; rotating a ink jet head having n nozzles per inch about a axis parallel to a substrate by an angle θ so that the ink jet head will produce an image on the substrate having (n/cos θ) dots per inch; storing in a data center that the specified image will be printed with (n/cos θ) dots per inch; analyzing the image to determine if the image has (n/cos θ) dots per inch; and comparing the number of dots per inch in the analyzed image with the number of dots per inch stored for the specified image to determine if they have the same number of dots per inch.

8 Claims, 6 Drawing Sheets

METHOD FOR DETERMINING A PRINTER'S SIGNATURE TO PROVIDE PROOF THAT THE PRINTER PRINTED A PARTICULAR DOCUMENT

CROSS REFERENCE TO RELATED APPLICATIONS

Reference is made to commonly assigned co-pending patent application Ser. No. 10/016,881 filed herewith entitled "Method For Determining A Printer's Signature And The Number Of Dots Per Inch Printed In A Document To Provide Proof That The Printer Printed A Particular Document" in the names of Donald G. Mackay, Claude Zeller, Robert A. Cordery, and Hugh L. Brunk.

FIELD OF INVENTION

The subject invention relates to a method for printing documents, and more particularly, to providing a method for determining the mechanism or printer on which the document was printed.

BACKGROUND OF THE INVENTION

There are many different types of documents issued by government agencies, corporations and individuals that authorize the holder of such documents to perform authorized tasks or grant rights to the holder of such a document. Examples of such documents are drivers' licenses, passports, entry access badges, identification cards, tickets, gift certificates, coupons, bonds, postal indicia, and the like.

With the advent of computers and refined printers that are available at a relatively low cost, the incidence of forgery of the above types of documents has proliferated. Although there are processes that apply coatings to documents to prevent copying, this does not end the problem of forgery.

Various schemes have been proposed to provide security to issued documents to inhibit forgeries of such documents. One such scheme is to use encryption so that a code can be derived that is based upon the information on the face of the issued document. Unfortunately, because of the limited space normally available in such documents, such a scheme often proves impractical.

The issuance of many types of tickets, such as theater tickets, is currently controlled by means of controlled supplies (e.g., serialized ticket stock, specially printed ticket stock, etc.) and by allowing tickets to be issued only by controlled, authorized issuers (e.g., ticket agents). Controlled supplies are expensive, difficult to control, and prone to theft or counterfeiting. Typically, one stood in line to purchase a ticket at the place the event was being held, or purchased the ticket over the phone from an authorized ticket agent who mailed the ticket to the purchaser.

Currently, ticketing companies are giving purchasers the option of printing their electronic tickets at home using ordinary paper, a personal computer printer, and an Internet connection. One of the problems in allowing people to print tickets at home is how to ensure that the tickets are not counterfeited. Furthermore, the printing technology used is another major factor, specifically when combined with the type of paper on which the ticket is printed.

Unfortunately, if a ticket is printed properly on ordinary paper with an encrypted bar code, the ticket can be photocopied, and the seller of the ticket will be unable to distinguish between the original ticket and the photocopied ticket.

SUMMARY OF THE INVENTION

This invention overcomes the disadvantages of the prior art by providing a method that determines whether or not a document was printed by a particular or specified printer. The invention provides a method that is able to determine the printer that produced a document in order to reduce the production of fraudulent documents. This invention utilizes the fact that printers render images that often contain unintended systematic errors that are a product of the design and manufacture of the printer. Even in the best printers, it is impossible to eliminate all possible sources of error. A printed image can be analyzed, and errors detected, thereby providing a 'fingerprint' that can be used to identify the printer (or product) used to print the image.

This invention provides a method for assigning unique printer resolutions or signatures, i.e., a unique number of dots per inch, to a class or models of printers or lines of postage meters. The number of dots per inch or resolution may be specified within an image on a document or within a postal indicia and later checked to determine if the image or document or the postal indicia has the correct resolution. The foregoing would be able to detect an image or postal indicia that was scanned into a computer and printed with a printer that did not have the number of dots per inch specified in the image or postal indicia.

In much the same way as described above, it is also possible to design 'errors' or 'defects' into the images appearing on documents, and the mechanism used to print an image, to be later used as a way of providing evidence that it was printed with a particular mechanism or printer. This invention makes use of these systematic 'defects' to provide forensic evidence of where the image was printed. This invention also makes it difficult to reproduce the images exactly with commercially available printers. In so doing, the value of the image is increased, because it not only communicates information that is visible to the observer but it also contains a 'fingerprint' that identifies the source of the document and makes the document difficult to copy exactly.

DETAILED DESCRIPTION OF PREFERRED EMBODIMENTS OF THE INVENTION

Figure 1:
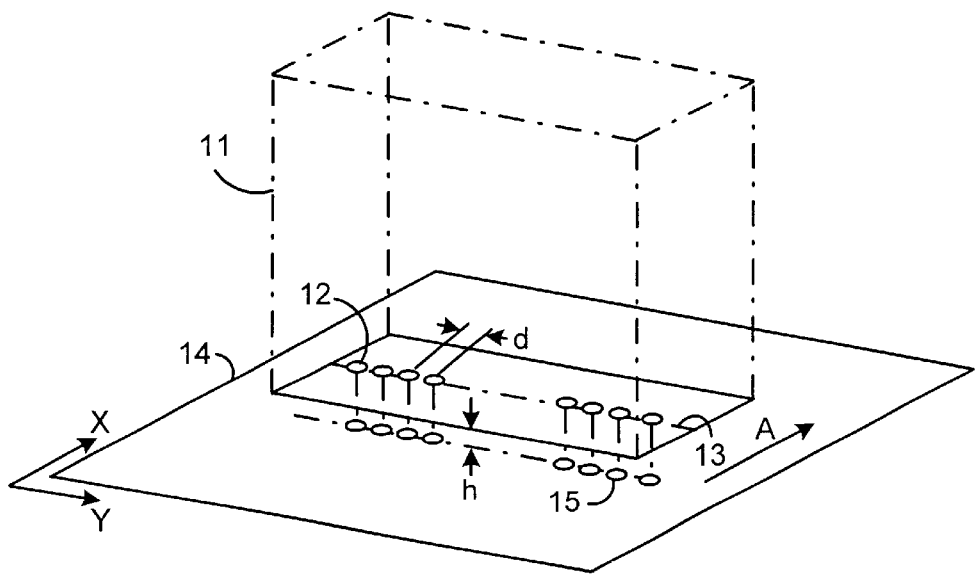
FIG. 1 is a perspective drawing of an ink jet print head configured as a linear array with a plurality of ink jet nozzles.

Referring now to the drawings in detail, and more particularly to FIG. 1, the reference character 11 represents an ink jet linear print head array having a plurality of nozzles 12 equally spaced linearly about axis 13 of array 11. The number of nozzles spaced in a one inch section of array 11 will determine the number of dots per inch array 11 prints. Thus, if the spacing "d" between the centers of nozzles 11 is $\frac{1}{300}$ of an inch, array 11 will print 300 dots per inch. Array 11 is spaced a distance h above substrate 14. The center of nozzles 12 is also equally spaced about axis 13 which is parallel to substrate 14 and perpendicular to transport direction A. Nozzles 12 will produce dots 15 on substrate 14.

Figure 2:
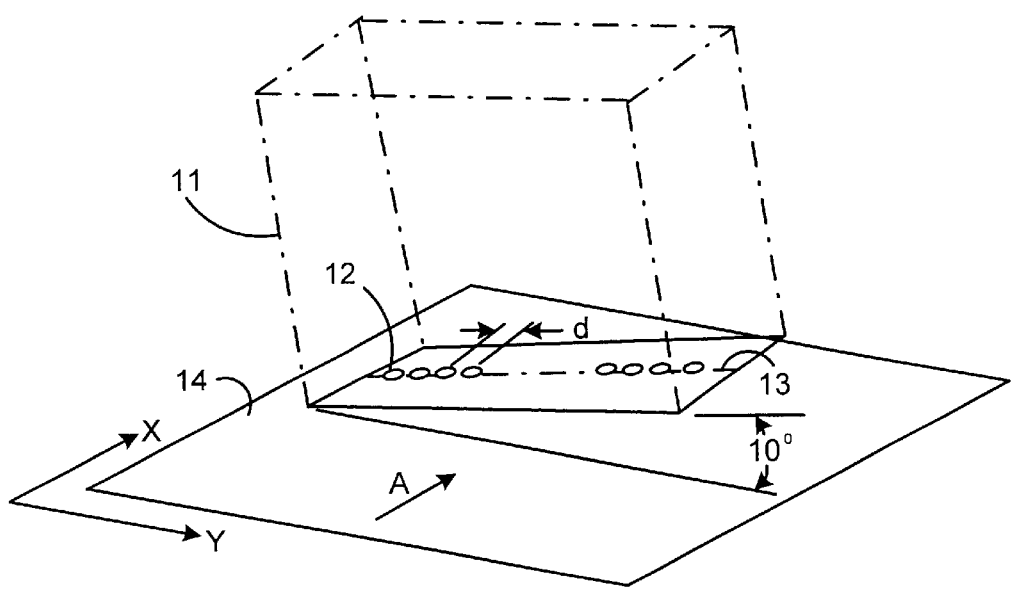
FIG. 2 is a perspective drawing of the print head of FIG. 1 mounted at an angle of 10° from its position in FIG. 1 to the substrate to provide a unique resolution by having closer nozzle spacing.

FIG. 2 is a perspective drawing of the print head of FIG. 1 mounted at an angle of 10° from its position in FIG. 1 to the substrate to provide a unique resolution by having closer nozzle spacing.

Figure 3:
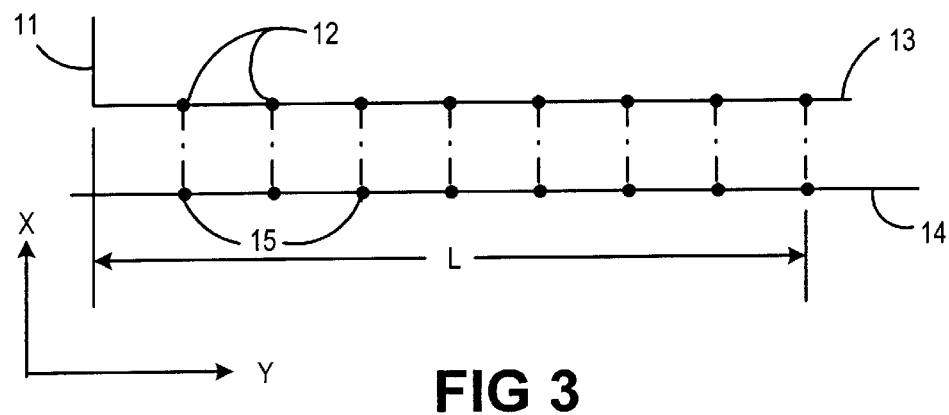
FIG. 3 is a drawing of a front view of the ink jet print head of FIG. 1.

FIG. 3 is a drawing of a front view of the ink jet print head of FIG. 1. Assuming distance L is one inch and there are 300 nozzles 12 of array 11 on axis 13 in distance L, one drop of ink from each nozzle 12 will be deposited on substrate 14. Thus, there will be 300 dots on substrate 14 in distance L.

Figure 4:
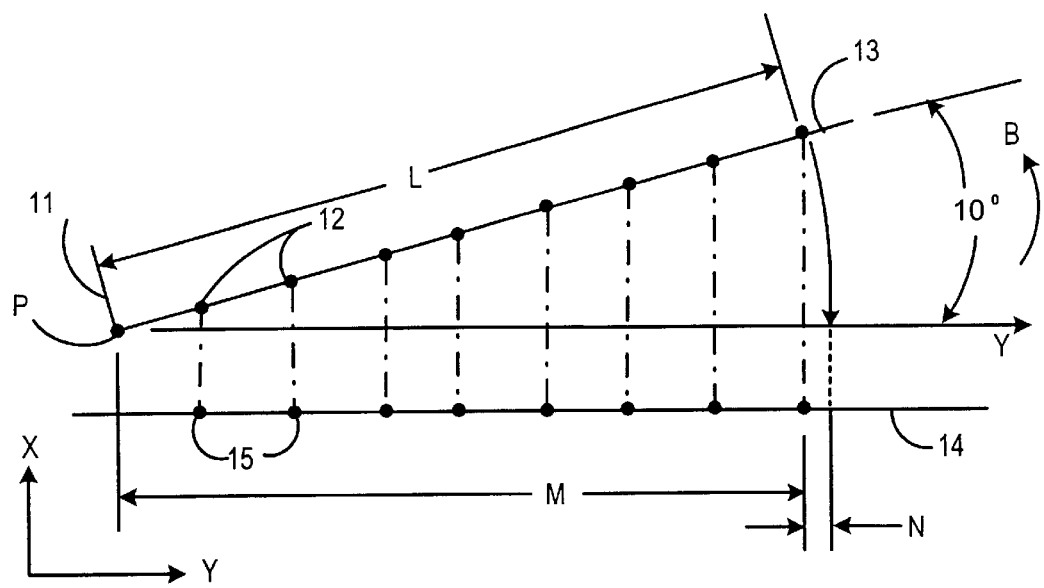
FIG. 4 is a drawing of a front view of the ink jet print head of FIG. 2 mounted at an angle of 10° from its position in FIG. 3 to the substrate to provide a unique resolution by having closer nozzle spacing in the Y direction.

FIG. 4 is a drawing of a front view of the ink jet print head of FIG. 2 mounted at an angle of 10° from its position in FIG. 3 to the substrate to provide a unique resolution by having closer nozzle spacing along the Y axis. Distance M plus distance N equals distance L. As array 11 rotates about point P in direction B, the effective vertical firing spacing between nozzles 11 and substrate 14 will be decreasing, thereby increasing the number of dots 15 per inch produced by array 11. Thus, when array 11 is rotated 10° about point P from substrate 14 the effective vertical firing spacing between nozzles 12 will decrease and the number of dots 15 produced in distance M on substrate 14 is still 300. The number of dots per inch produced by array 11 on substrate 14 will be 305.

Figure 5:
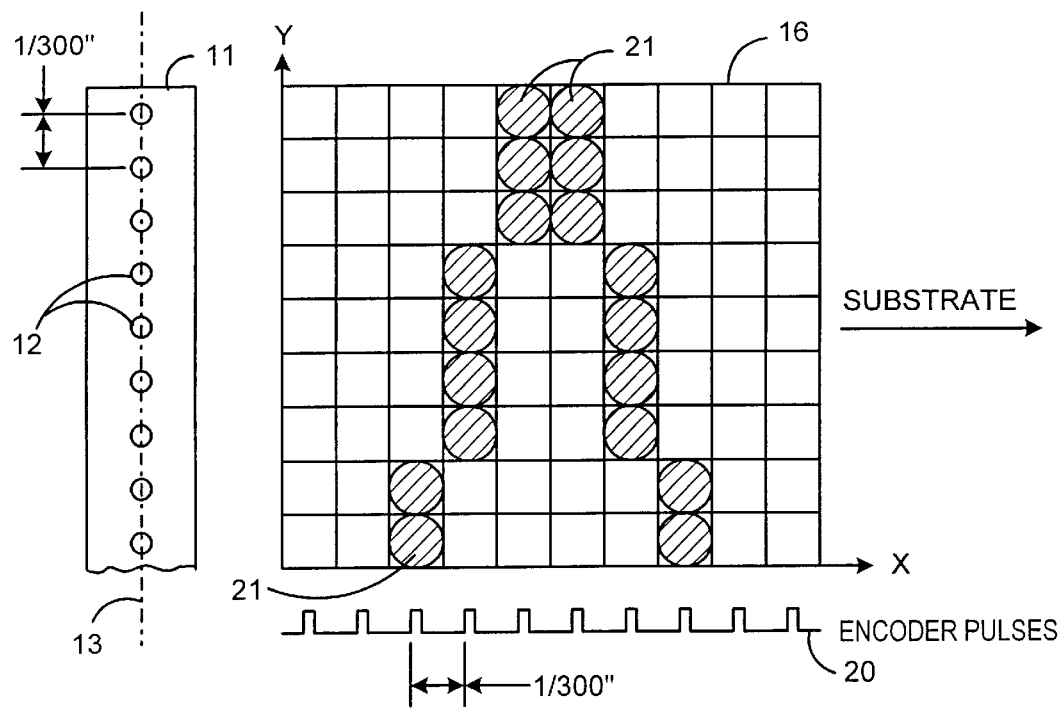
FIG. 5 is a drawing of the character 'A' printed on a substrate in which the spacing of ink jet nozzles controls the printing of dots along the Y axis and encoder trigger pulses controls the printing of dots along the X axis.

Since, cos 10° = M/1
.9848 inches = M
Thus, 300 dots 15 will be produced in distance M on substrate 14.
.9848 inches =   1 inch
dots in M        dots in M+N
.9848 inches =   1 inch
300              dots in M+N
.9548 M+N = 300
M =N = 304.63 = 305 dots per inch FIG. 5 is a drawing of the character 'A' printed on a substrate in which the spacing of ink jet nozzles controls the printing of dots along the Y axis, and encoder trigger pulses controls the printing of dots along the X axis. Ink jet linear print head array 11 has a plurality of nozzles 12 spaced $\frac{1}{300}$ of an inch apart about axis 13 of array 11.

Figure 9:
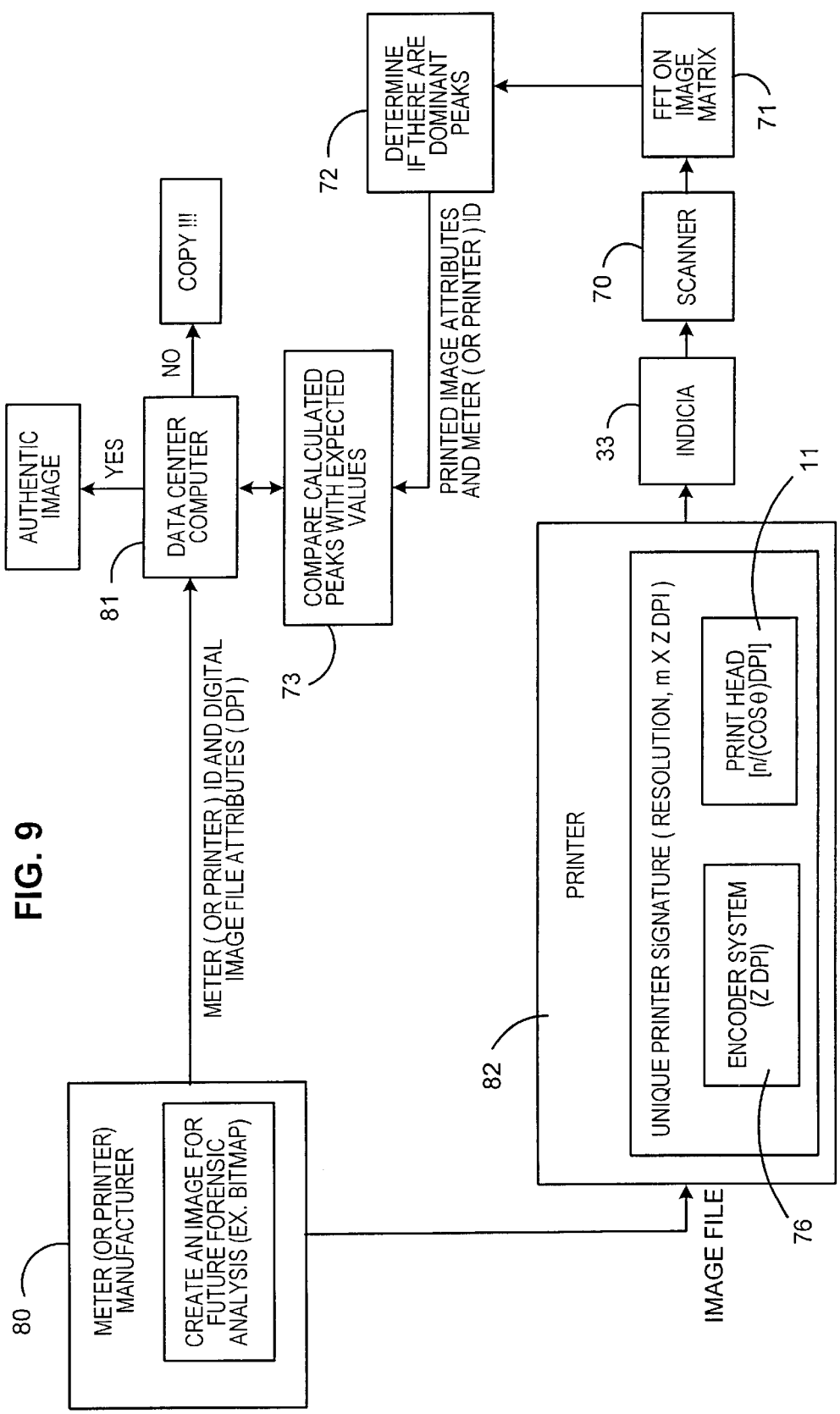
FIG. 9 is a block diagram showing the process steps of this invention.

Encoder trigger pulses 20 are produced by a rotary encoder containing a disk with etched lines matched to the printer resolution, coupled to the mechanism transporting the print head (or the substrate to be printed upon). It is necessary to use an encoding device to accurately position individual pixels and build the character 'A' by printing dots 21. Encoder 76 described in the description of FIG. 9 is typically coupled to the substrate directly or to a belt or roller that is moving the substrate (envelope or label). For example, in an ink jet printer rendering images at 300×300 dots per inch resolution, the encoder is designed so that it provides an electrical pulse each time the print head (or substrate) advances $\frac{1}{300}$". Upon receiving the encoder pulse the printer fires the necessary ink jet nozzles, printing a column of image data, thereby producing the necessary pattern of pixels or dots 21 to create a portion of the character 'A' on substrate 16. One way to change the distance between pulses (and printed pixels or dots 21) is by changing the physical design of the encoding system, thereby creating a unique resolution for the printer. For example, in the case where an encoder is coupled to a shaft driving a roller to transport an envelope, the diameter of the roller can be altered to increase or decrease the spacing of printed pixels. If a roller had been nominally sized to provide pulses at 300 dots per inch, it could be increased by 5% to provide pulses at 286 dots per inch or decreased by 5% to generate encoding pulses at 316 dots per inch. Using this technique to create unique printing resolutions, it would be possible to assign unique printing resolutions to particular printers. The images created by these printers could be traced to the printer by subsequently scanning and analyzing the image to determine the frequency (or spacing) of the printed pixels or dots. In the example described above, the unique spacing would be fixed and unchanging.

Figure 6:
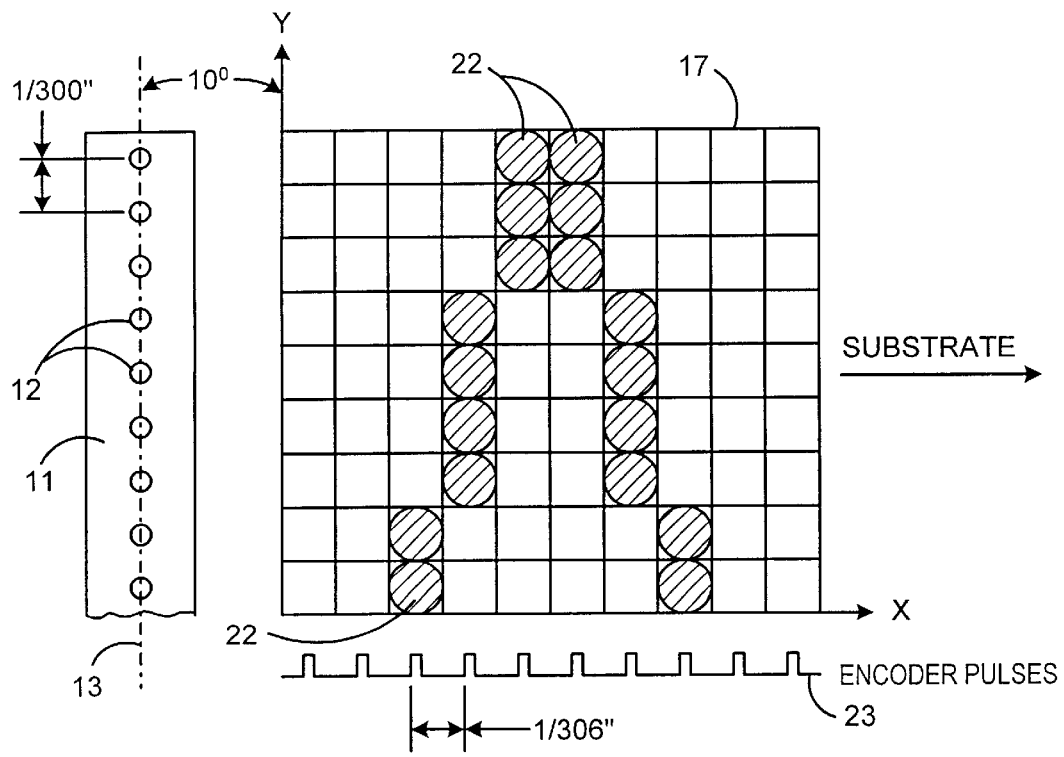
FIG. 6 is a drawing of the character 'A' printed on a substrate in which the ink jet print head is mounted at an angle of 10° from its position in FIG. 3 to the substrate to provide a unique resolution by having closer nozzle spacing of the dots along the Y axis and encoder trigger pulses are specified to provide a unique resolution of dots along the X axis.

FIG. 6 is a drawing of the character 'A' printed on a substrate in which the ink jet print head is mounted at an angle of 10° from its position in FIG. 3 to the substrate to provide a unique resolution by having closer nozzle spacing of the dots along the Y axis, and encoder trigger pulses are specified to provide a unique resolution of dots along the X axis. The number of dots 22 per inch (distance M+N described in FIG. 4) produced by array 11 on substrate 17 along the Y axis will be 305. The number of dots 22 per inch along the Y axis may be varied by mounting ink jet print head 11 at various angles. For instance, when print head 11 is mounted at an angle of 15° from its position in FIG. 3 to the substrate, 311 dots per inch will be produced along the Y axis of substrate 17; and, when print head 11 is mounted at an angle of 20° from its position in FIG. 3 to the substrate, 319 dots per inch will be produced along the Y axis of substrate 17.

Figure 8:
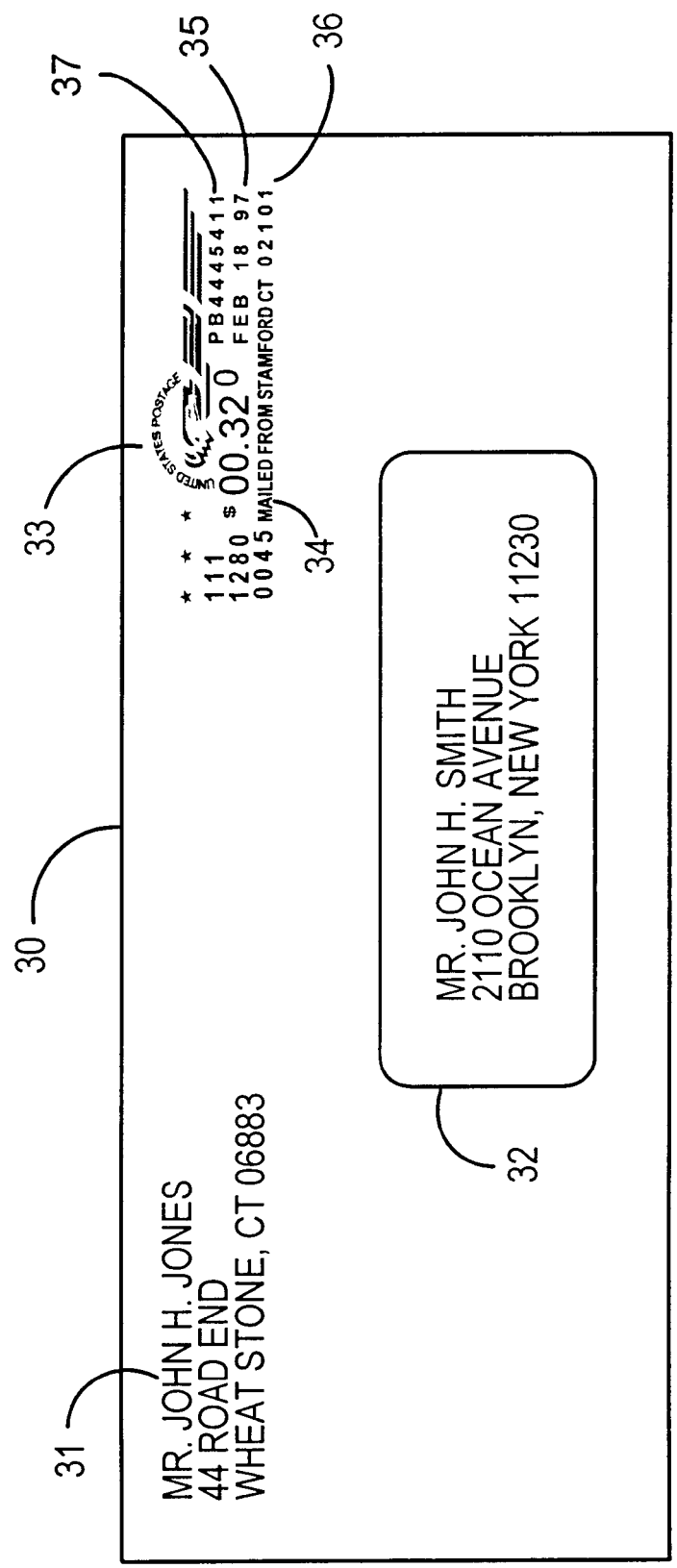
FIG. 8 is a drawing of a document in the form of a mail piece that was printed by an authorized printer that printed all or a portion of the mail piece at a specified number of dots per inch.

The diameter of the roller of encoder 76 of FIG. 8 is sized to produce encoder pulses 23 at 306 dots per inch along the X axis. The number of dots 22 per inch along the X axis may be varied by changing the diameter of the roller of encoder 76. For instance, if the diameter of the roller of encoder 76 that produced 300 dots per inch was made twice as large, the encoder pulses would be twice as far apart, i.e., $\frac{1}{150}$ of an inch; and, if the diameter of the roller of encoder 76 that produced 300 dots per inch was made one half the size the encoder, pulses would be closer together, i.e., $\frac{1}{600}$ of an inch. For the 300 dots per inch ink jet head and encoder described above, many different resolutions may be obtained, i.e., number of different dot spacing that may be printed along the X axis multiplied by the number of different dot spacing that may be printed along the Y axis (100)(100)=10,000 different unique resolution combinations. It would be obvious to one skilled in the art that for each different ink jet head that produces different numbers of dots per inch, i.e., 300, 600, 1200, etc., an encoder in which the number of pulses may be varied many different resolutions may be obtained.

Figure 7:
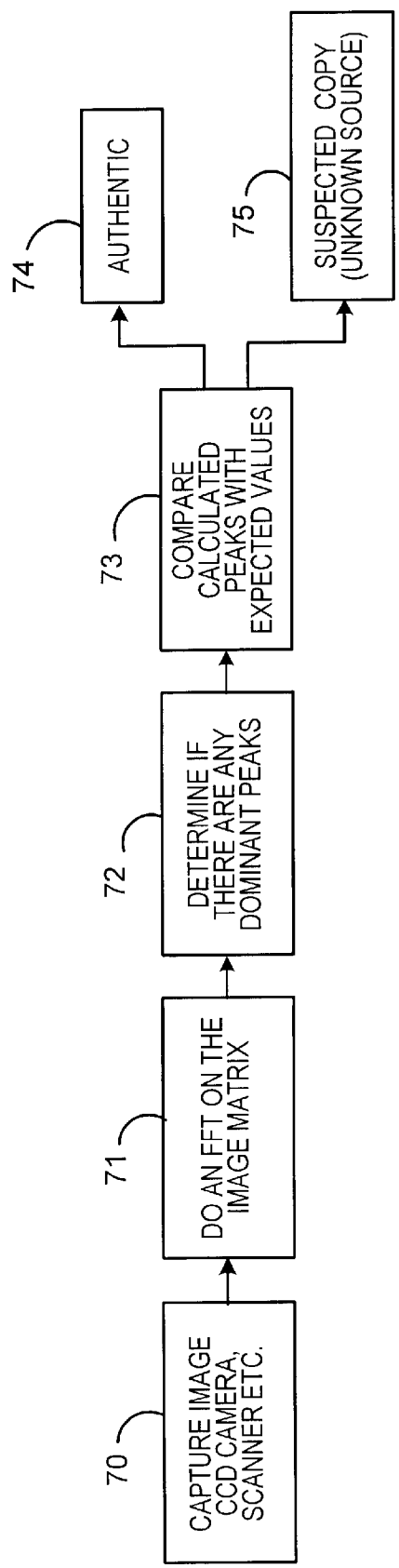
FIG. 7 is a block diagram that shows how the image may be analyzed to determine the number of dots per inch in the image.

FIG. 7 is a block diagram that shows how the image may be analyzed to determine the number of dots per inch in the image. The QEA model IAS 1000, manufactured by QEA of 99 South Bedford Street, Burlington, Mass. 01803, may be used to identify the resolution of the printer that is used to create the image. The QEA model IAS 1000 has a 'banding' function that calculates frequency related characteristics of an image. The image is first captured at high resolution, and the light reflectance data is saved as a gray scale image bit map. The resulting image matrix is then operated on by a fast fourier transform to convert the data from the spatial domain to the frequency domain. The image analysis process may be mapped out as follows. Blocks 70, 71 and 72 may be the QEA model IAS 1000. The image is captured in block 70 by a charged coupled device camera, or a scanner, etc. Then in block 71 a fast fourier transform is performed on the image matrix. Block 72 determines if there are any dominant peaks in the transformed image. Now block 73 compares the calculated value of the peaks with the expected value of the peaks. If the calculated value of the peaks is the same as the expected value of the peaks, the image is authentic and a signal is sent to block 74 'authentic'. If the calculated value of the peaks is not the same as the expected value of the peaks, the image is a suspected copy, and a signal is sent to block 75 suspected copy from unknown source.

Another method for analyzing an image to determine the number of dots per inch in the image and to verify that a document was printed on a printer with a unique resolution (a specified number of dots per inch) involves printing a unique pattern of dots that coincides with the printer resolution and measuring the distance between columns of dots and the gaps between them. When the image is printed at a different resolution than the one specified above, the resulting image would not look the same as the image specified above.

FIG. 8 is a drawing of a document in the form of a mail piece that was printed by an authorized printer that printed the all or a portion of the mail piece at a specified number of dots per inch. Mail piece 30 has a recipient address field 31 and a sender address field 32. A postal indicia 33 that was made by an electronic meter is affixed to mail piece 30. Indicia 33 contains a dollar amount 34; the date 35 that postal indicia 33 was affixed to mail piece 30; the place the mail piece was mailed from 36; the postal meter serial number 37; and, an eagle.

FIG. 9 is a block diagram showing the process steps of this invention. Meter or printer manufacturer 80 mounts print head 11 in printer 82 to provide a unique resolution of dots in the Y direction. Then manufacturer 80 installs encoder 76 in printer 82 to provide a unique resolution of dots along the X axis. Now manufacturer 80 creates a bit map image that may be used for future forensic analysis of the specific number of dots produced (unique resolution) by the mounting of ink jet print head 11 and encoder 76 in printer 82. The aforementioned bit map image together with the digital image file attributes (dots per inch), serial number of printer 82 and/or the serial number of the meter are transmitted to data center computer 81. Data center computer 81 stores the above information. Printer 11 will print mail piece 30 having indicia 33. Scanner 70 will capture the image of indicia 33 and a fast fourier transform is performed in block 71 on the image matrix. Block 72 determines if there are dominant peaks in the transformed image. Now block 73 and data center computer 81 compare the calculated value of the peaks with the expected value of the peaks. If the calculated value of the peaks is the same as the expected value of the peaks the image is authentic. If the calculated value of the peaks is not the same as the expected value of the peaks the image is not authentic, i.e., a copy.

The above specification describes a new and improved method for increasing the security of a document by being able to detect when an image is copied. It is realized that the above description may indicate to those skilled in the art additional ways in which the principles of this invention may be used without departing from the spirit . Therefore, it is intended that this invention be limited only by the scope of the appended claims.

What is claimed is:

1. A method for determining whether an image on a substrate has a specified number of dots per inch, said method includes the steps of:

specifying that the image on the substrate will be printed with n plus m dots per inch, wherein n and m are positive integers;

rotating an ink jet head having n nozzles per inch about a axis parallel to a substrate by an angle $\theta$ so that the ink jet head will produce an image on the substrate having ($n/\cos \theta$) dots per inch;

storing in a data center that the specified image will be printed with ($n/\cos \theta$) dots per inch;

analyzing the image to determine if the image has ($n/\cos \theta$) dots per inch; and comparing the number of dots per inch in the analyzed image with the number of dots per inch stored for the specified image to determine if they have the same number of dots per inch.

2. The method claimed in claim 1, wherein the image is a postal indicia.

3. The method claimed in claim 1, wherein the image is a graphic.

4. The method claimed in claim 1, wherein the analyzing step further includes the steps of:

scanning the image;

performing a Fast Fourier Transform on the image; and determining dominant peaks of the Fast Fourier Transform.

5. The method claimed in claim 1, wherein the axis is the Y axis.

6. The method claimed in claim 5, further including the step of:

positioning individual dots about the X axis to build an image.

7. The method claimed in claim 5, further including the step of:

specifying a spacing of dots about the X axis to create an image.

8. The method claimed in claim 7, further including the steps of:

storing in the data center that the specified image will be printed with a specified number of dots per inch along the X axis;

analyzing the image to determine if the image has the specified dots per inch along the X axis; and comparing the number of dots per inch along the X axis in the analyzed image with the number of dots per inch along the X axis stored for the specified image to determine if they have the same number of dots per inch.

* * * * *